G. C. JENSEN.
LOCK CONTROLLED LEVER.
APPLICATION FILED JAN. 3, 1917.
1,219,106.
Patented Mar. 13, 1917.
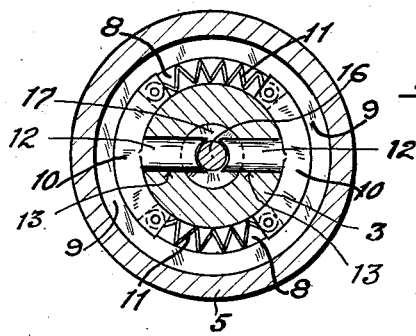
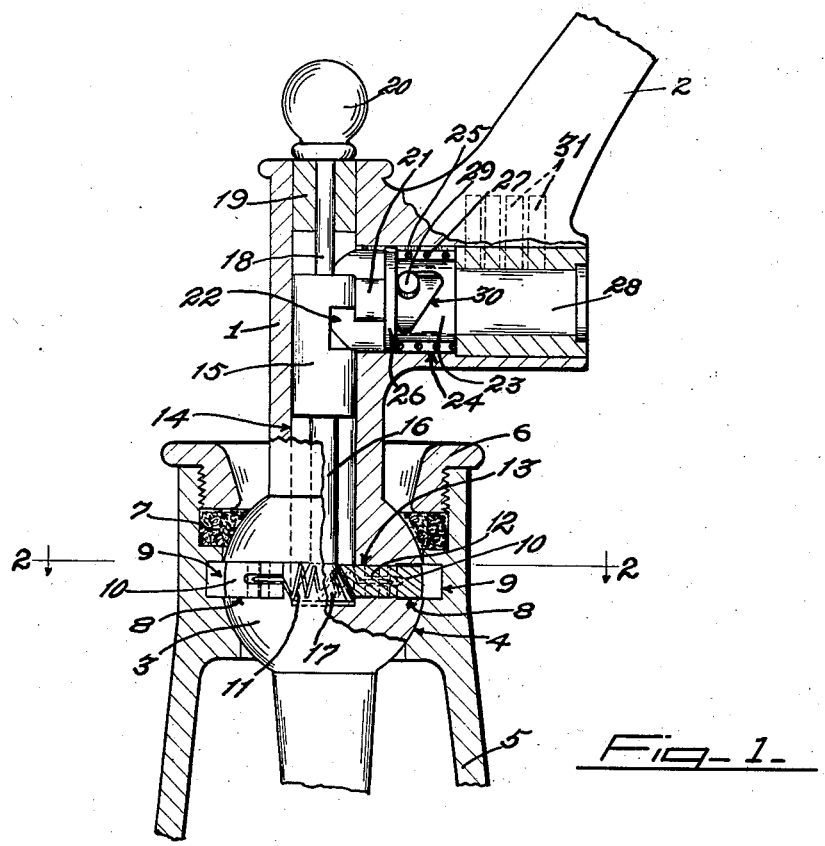
WITNESS
INVENTOR.
George C. Jensen
BY
Acker & Joslin
his ATTORNEY.

UNITED STATES PATENT OFFICE.

GEORGE C. JENSEN, OF OAKLAND, CALIFORNIA.

LOCK-CONTROLLED LEVER.

1,219,106.      Specification of Letters Patent.      Patented Mar. 13, 1917.

Application filed January 3, 1917. Serial No. 140,471.

*To all whom it may concern:*

Be it known that I, GEORGE C. JENSEN, a citizen of the United States, residing at Oakland, in the county of Alameda and State of California, have invented certain new and useful Improvements in Lock-Controlled Levers, of which the following is a specification.

The present invention relates to means for locking movable levers, to prevent operative movement thereof, and is particularly applicable to the control levers of a motor vehicle.

The object of the invention is to provide a device of the described type which is of simple and strong construction, and which may be easily and conveniently operated. The device is designed particularly for use in connection with a well known type of gear shifting lever used in motor vehicles, and has for its function the locking of said gear shifting lever in its neutral position, to prevent the engagement of the power-transmitting gears of the vehicle, and by so doing to prevent theft or unauthorized use of said vehicle. The device is equally applicable, however, to levers used for other purposes.

With this and other objects in view, the invention consists in the novel construction of parts hereinafter described, illustrated in the accompanying drawings, and pointed out in the claims hereto appended, it being understood that minor changes in form and construction, within the scope of the claims, may be made without departing from the spirit of the invention, or sacrificing any of the advantages thereof.

In order to comprehend the invention, reference should be had to the accompanying drawings, wherein:

Figure 1 is a part sectional elevation of a portion of a motor vehicle gear-shifting lever and the fulcrum support therefor showing my locking device incorporated therein.

Fig. 2 is a sectional plan view taken in the direction of the arrows on the line 2—2 of Fig. 1.

In the drawings, the reference numeral 1 designates a movable lever having an offset upper portion 2 at the end of which is a suitable handle, not shown in the drawings, said lever being of a type commonly used for shifting the power-transmitting gears of a motor vehicle. Said lever 1 has a spherical fulcrum portion 3, which is movably seated within a substantially spherical socket 4 formed in a fixed tubular supporting and inclosing member 5. A ring or nut 6, screwed into the upper end of said support 5, retains the lever 1 therein, there being suitable packing material 7 interposed between said ring and the spherical portion 3 of said lever.

The spherical portion 3 of the lever is formed with a horizontal annular groove 8, adapted to be in alinement, when the lever is in its neutral or inoperative position, with an annular groove 9 formed in the spherical socket 4. A pair of oppositely disposed arcuate locking members 10 are freely mounted in the groove 8 in the lever, and are normally retained therein by springs 11. Said locking members have inwardly extending arms 12, lying within apertures 13 formed in the lever, and having inclined or beveled inner faces, as shown, which project into a longitudinal bore 14 formed in the lever 1 and extending to the upper end of the straight portion thereof.

Within the bore 14 is a vertically movable bolt 15 having a rod 16 extending downwardly therefrom, said rod terminating in a conical head 17 lying between the arms 12 of the locking members 10 and adapted to engage the beveled faces thereof. A rod 18 extends upwardly from said bolt, through a guide 19, and carries on its upper end a knob or handle 20. Thus by elevating the bolt 15 by means of the knob 20, the conical head 17 spreads the locking members 10, causing the same to engage the groove 9 in the socket 4, as well as the groove 8 within which said members lie, and thereby to lock the lever against movement. The weight of the bolt 15 assisted by the force of the springs 11 acting through the beveled faces of the arms 12 and the conical head 17, returns said bolt to its normal position.

For retaining the bolt 15 in its upper or locking position, I provide a latch 21, adapted to enter a notch 22 in the side of said bolt, said latch being carried by a sleeve 23, slidably mounted within a transverse bore 24 formed in the lever at the base of the offset portion 2 thereof, and prevented from rotating in said bore by a feather 25 which engages a notch (not shown) formed in a flange 26 extending from said sleeve. A spring 27, acting behind said flange 26, presses the latch 21 into the notch 22 when the latter is in the proper position.

A key controlled lock 28 preferably of the cylinder type, is rotatably mounted in the transverse bore 24, and has its rear end lying within the latch sleeve 23. A pin 29, projecting laterally from the inner end of said lock barrel 28, engages a triangular slot 30 in said sleeve 23, so that said sleeve is moved axially, to withdraw the latch 21 from the notch 22, by the rotation of said lock barrel. The lock 28 may be of any desired type, controlled by a suitable key, not shown, and retained by tumblers indicated at 31.

The operation of the device will be readily understood from the foregoing description. The lock barrel 28 is understood to remain normally in the position shown in Fig. 1 of the drawings. When it is desired to lock the lever 1 against movement, the knob 20 is drawn up, thereby forcing the locking members 10 outwardly into the groove 9 in the socket 4. At the same time, the latch 21 actuated by the spring 27, engages the notch 22 in the bolt 15 and retains the parts in locking position.

To unlock the lever, the key, not shown, is inserted into the lock 28, and said lock is turned, by means of said key, the pin 29 and the slot 30 coöperating to withdraw the latch 21 from the notch 22, whereupon the bolt 15 and the locking members 10 return to their normal positions.

Having thus described my invention what I claim is:—

1. In combination with a movable lever having a straight lower portion, an offset upper portion, and a spherical fulcrum portion; a substantially spherical socket member within which said spherical fulcrum portion is movably seated, said socket member having a groove formed therein, laterally movable locking members associated with said spherical lever portion and adapted to engage said groove to lock said lever against movement; a lineally movable bolt carried within the straight lower portion of the lever for actuating said locking members; a lock controlled means for retaining said bolt in operative position.

2. In combination with a movable lever having a straight lever portion, an offset upper portion, and a spherical fulcrum portion; a substantially spherical socket member within which said spherical fulcrum portion is movably seated, said socket member having a groove formed therein; laterally movable locking members associated with said spherical lever portion and adapted to engage said groove to lock said lever against movement; a lineally movable bolt for actuating said locking members, said bolt being carried within the straight lower portion of said lever and projecting from the upper end thereof to form a handle; and lock controlled means adapted to engage said bolt to retain the same in operative position.

3. In combination with a movable lever having a straight lever portion, an offset upper portion, and a spherical fulcrum portion; a substantially spherical socket member within which said spherical fulcrum portion is movably seated, said socket member having a groove formed therein; laterally movable locking members associated with said spherical lever portion, and adapted to engage said groove to lock said lever against movement; a lineally movable bolt for actuating said locking members, said bolt being carried within the straight lower portion of said lever and projecting from the upper end thereof to form a handle; a transversely movable latch adapted to engage said bolt to retain the same in locking position; and lock controlled means for actuating said latch.

4. In combination with a movable lever having a lineal bore and a spherical fulcrum portion; a substantially spherical socket member within which said spherical fulcrum portion is movably seated, said socket member having a groove formed therein; laterally movable locking members associated with said spherical lever portion and adapted to engage said groove to lock said lever against movement; a lineally movable bolt carried within the bore of said lever for actuating said locking members; means for moving said bolt; a lateral projection, having a bore therein extending from said lever; a transversely movable latch mounted within said lateral bore and adapted to engage said bolt to hold the same in operative position; a cylindrical sleeve upon which said latch is carried, said sleeve having a cam slot formed therein; a rotatable key controlled lock mounted in said lateral bore and within said sleeve; and a pin carried by said lock and engaging said cam slot, whereby rotation of said lock causes axial movement of said sleeve.

In testimony whereof I have signed my name to this specification in the presence of two subscribing witnesses.

GEORGE C. JENSEN.

Witnesses:
N. A. ACKER,
D. B. RICHARDS.